United States Patent Office 3,355,199
Patented Nov. 28, 1967

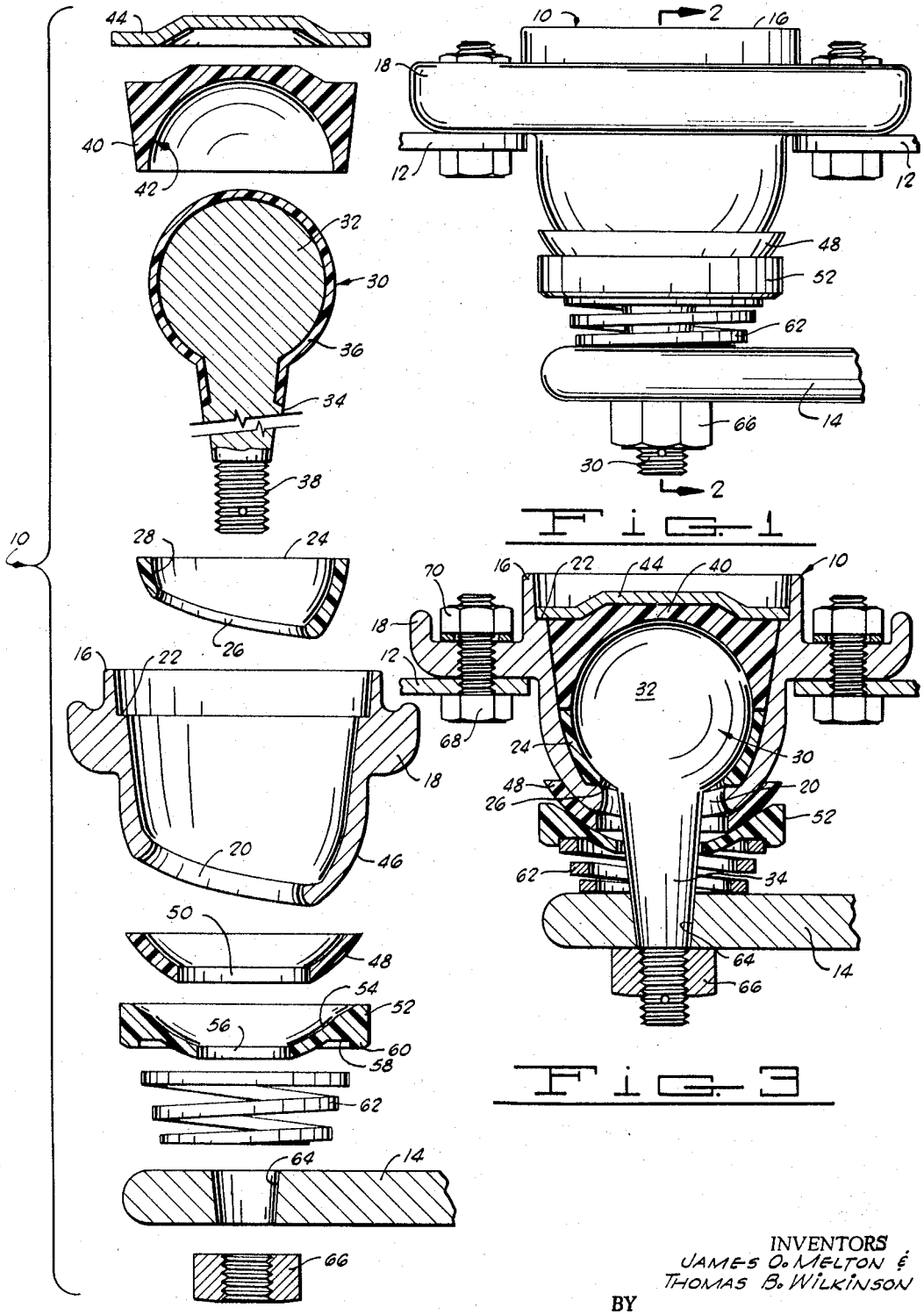

3,355,199
BALL AND SOCKET JOINT
James O. Melton, Norman, and Thomas B. Wilkinson, Oklahoma City, Okla., assignors to Jamco, Inc., Oklahoma City, Okla., a corporation of Oklahoma
Filed Mar. 16, 1964, Ser. No. 352,026
3 Claims. (Cl. 287—90)

This invention relates generally to ball and socket joints. More particularly, but not by way of limitation, this invention relates to ball and socket joints of greatly simplified construction utilizing bearing surfaces of dissimilar materials.

Ball and socket joints have been constructed in the past utilizing synthetic resins for either or both of the relatively moving bearing surfaces therein. Joints of this type as proposed by this invention, as well as those previously constructed, are well suited for use in the front end suspension of automobiles. In spite of the improved steering afforded due to the reduction of friction in joints of this type as previously constructed, some further improvement in the cost of construction of such joints has been generally recognized as desirable. The cost has remained higher than desirable due to the high cost of permanently lubricated bearing materials, the expense involved in forming the complex shaped bearing elements heretofore used, and the labor and time involved in assembling the joints due to the additional parts involved.

Some ball and socket joints proposed in the past, and almost all supplied on original equipment, require lubrication from time to time to reduce friction, prevent wear, and inhibit the entrance of foreign materials into the joint. A very desirable feature in such joints, while maintaining resistance against turning, would be the elimination of the necessity for lubrication. Particularly when such joints are used in automobiles, lubrication is left to the user. Failure to lubricate at proper intervals results in wear and high frictional resistance and may ultimately result in a complete joint failure. A ball and socket joint eliminating the need for lubrication, whether such joint is constructed of metal or of synthetic resin, provides obvious advantages.

Examples of the types of ball and socket joints hereinbefore in use which make use of synthetic resin elements in the bearing are U.S. Patent 2,912,267 to Latzen, U.S. Patent 3,073,634 to Gottschald, and U.S. Patent 2,913,268 to Booth. The Gottschald and Booth patents are examples of ball and socket joints in which plastic-to-metal bearing surfaces are employed. Both require lubrication throughout the life of the joints, which lubrication is provided through the use of a grease fitting in the Booth structure, and through the use of a porous material filled with lubricant in the Gottschald structure.

The Latzen ball and socket joint, on the other hand, requires the inclusion of a precisely machined compression spring internally in the bearing and, by reason of the requirement of such spring for loading the bearing, is considerably more expensive than the simple structure which is proposed by the present invention. It may also be perceived in referring to the Latzen structure that the internal elements of the bearing are many in number and, in some cases, are relatively complicated in configuration. (See, for example, the structure shown in FIGURES 6, 7 and 8 of the Latzen patent.)

The Gottschald ball and socket joints are of higher than optimum cost because of the necessity to include in one of the types of the Gottschald joints a closely machined helical spring positioned inside the joint, a resilient plate and an insert of porous lubricant-containing material. In the other form of the Gottschald joint (shown in FIGURE 2 of the patent), the cost of the ball and socket joint is increased by the necessity to form the fixed resin bearing elements in at least four separate parts in order to position them inside the substantially closed metallic socket which has only a small opening therethrough for the accommodation of the ball shank 7.

The present invention provides a ball and socket joint which is very simple in construction, has a minimum number of separate elements and moving parts, and is much less expensive to construct than ball joints of the type heretofore in use. Moreover, the ball and socket joints of this invention avoid the provision of any metal-to-metal contact within the joints, and provide instead bearing surfaces which are, in each case, of high density synthetic resin. Stated in another way, the ball and socket joints of the present invention do not depend upon bearing surfaces which constitute a metal surface in contact with either another metal surface or a surface formed of high density synthetic resin. Because of the geometric configuration of the elements of the ball and socket joint, and the way in which these elements are arranged relative to each other, the joints of the present invention can be assembled very quickly and by operators who are totally unskilled in the technique of assembly. Moreover, the parts are configured in such a way that failure to assemble the proper part in the proper place so as to result in an excessively high number of reject joints is obviated.

Broadly, the present invention is a ball and socket joint which provides a simplified structure incorporating adjacent bearing surfaces formed from dissimilar materials. In one aspect of the invention, a metallic ball may be operating against metallic inserts which are retained in a generally tubular member and which are formed from a permanently lubricated material. Another aspect of the invention provides for sheathing the ball in a synthetic resin which requires no lubrication. Also, the inserts retained in the generally tubular member for coaction with the ball may be formed from a different synthetic resin than that used in sheathing the ball. In each of these arrangements, it is preferred to provide a synthetic resin sealing ring outside of, and cooperating with, the generally tubular member to prevent the entrance of foreign materials into the joint.

One object of the invention is to provide an improved ball and socket joint that offers little resistance to the relative turning movement of two members which it is used to interconnect.

Another object of the invention is to provide an improved ball and socket joint which does not require lubrication during its service life.

A further object of the invention is to provide an improved ball and socket joint that may be easily and economically manufactured.

An additional object of the invention is to provide an improved ball and socket joint that incorporates individual parts which are easily constructed and which may be quickly assembled to form a complete joint.

Still another object of the invention is to provide an improved ball and socket joint that effectively prevents the entrance of foreign materials into the bearing surface of the joint.

The foregoing and other objects and advantages of the invention will become more apparent as the following description is read in conjunction with the accompanying drawings wherein like reference characters denote like parts in all views, and wherein:

FIG. 1 is an elevation view of a ball and socket joint constructed in accordance with the invention;

FIG. 2 is an exploded sectional view of the ball and socket joint of FIG. 1 taken along the line 2—2 of FIG. 1; and, FIG. 3 is a vertical, cross-sectional view of the assembled ball and socket joint shown in FIG. 1.

Referring now to the drawings, and to FIG. 1 in particular, shown therein and generally indicated by the reference numeral 10 is a ball and socket joint constructed in accordance with the invention. The ball and socket joint 10 is utilized to interconenct two relatively moving parts 12 and 14.

The specific details of construction of the ball and socket joint 10 are clearly illustrated in the exploded sectional view of FIG. 2. The section has been taken along the line 2—2 of FIG 1. The ball and socket joint 10 includes a generally tubular housing or member 16 which is provided with an external flange 18, an aperture 20 which extends through the lower end of the housing 16, and an interior shoulder 22 which is formed interiorly in the housing near the upper end thereof. As illustrated, the aperture 20 is, in the illustrated embodiment, offset from the general center line of the housing 16. This facilitates greater freedom of movement of a control arm 14 to which the joint 10 is connected as hereinafter described since, in many installations, this control arm is mounted to extend at an angle to the center line or axis of the housing. A lower insert 24 is shown immediately above the tubular housing 16 in FIG. 2. As shown, the lower insert 24 has an exterior configuration conforming to the interior of the tubular housing 16 and has an aperture 26 which generally coincides with the aperture 20. The interior surface 28 of the lower insert 24 is of generally frusto-spherical configuration.

A ball member 30 is provided with an upper spherical end portion 32 and a lower tapered spindle portion 34. The ball portion 32 of the ball member 30 and a portion of the spindle 34 is illustrated as being coated or sheathed in a high density synthetic resin 36. The lower end of the tapered spindle portion 34 is provided with an external thread 38, the purpose of which will be explained more fully hereinafter. An upper insert 40 has an exterior configuration conforming to the interior of the tubular housing 16 and an interior surface 42 which is substantially hemispherical in configuration. The upper insert 40 and the lower insert 24 are formed from a high density synthetic resin. The ball and socket joint also includes a plate 44 which is sized to be pressed or otherwise retained in the upper portion of the tubular housing 16 in engagement with the shoulder 22 located therein.

The lower exterior 46 of the tubular housing 16 is of generally spherical configuration to cooperate with a frusto-spherical member 48 which has an aperture 50 extending therethrough sized to engage the tapered spindle 34 of the ball member 30. The frusto-spherical member 48 is arranged to closely engage the exterior surface 46 of the housing 16 and to tightly engage the spindle 34 which extends through the aperture 50 to prevent the entrance of dirt or other foreign particles into the ball joint 10 after assembly.

A thrust washer 52 has an internal surface 54 which is shaped to conform to the exterior of the frusto-spherical member 48 and an aperture 56 which coincides with the aperture 50 of the frusto-spherical member 48 and is dimensioned to engage the spindle portion 34 of the ball member 30. The lower exterior of the thrust washer 52 is provided with an annular groove 58 which is enclosed by a circumferentially extending flange or projection 60. The frusto-spherical member 48 and the thrust washer 52 are preferably formed from a high density synthetic resin, each having a different molecular structure than the other, so that friction therebetween is reduced to a minimum.

A resilient member, such as a helical spring 62, is interposed between the thrust washer 52 and the relatively moving member 14 which is to be interconnected to the other relatively moving member 12 by means of the ball and socket joint 10. The helical spring 62 has an upper end which is sized to fit within the annular groove 58 of the thrust washer 52 and is preferably tapered from its upper end to its lower end. An aperture 64 extends through the member 14 and is tapered to mate with the tapered spindle portion 34 of the ball member 30 so that the member 14 can be wedged on the spindle portion 34 and prevent relative movement therebetween. A threaded nut 66 is provided to threadedly engage the external threads 38 on the lower end of the spindle portion 34 of the ball member 30 to secure the member 14 to the ball member 30.

FIG. 3 illustrates the ball and socket joint 10 assembled and in a cross-sectional view taken along a plane rotated 90 degrees from the cross-section illustrated in the exploded view of FIG. 2. Also, FIG. 3 illustrates one method of connecting both of the relatively moving members 12 and 14 to the ball and socket joint 10. As shown therein, the member 12 is connected to the flange 18 of the housing 16 by means of bolts 68 which extend through the member 12 and through the flange 18. The opposite ends of the bolts 68 are provided with nuts 70 which are threadedly secured thereon. The other relatively moving member is secured to the tapered spindle portion 34 of the ball member 30 by the nut 66, as previously described.

As can be appreciated from observing FIG. 3, the ball and socket joint 10 can be very quickly and easily assembled. The lower insert 24 is placed in the interior of the housing 16, the ball member 30 is inserted therein with the spindle portion 34 extending through the aperture 26 in the lower insert 24 and through the aperture 20 in the tubular housing 16. The upper insert 40 is then placed in the tubular housing 16 with the generally hemispherical interior surface 42 adjacent the ball portion of the ball member 30. The plate 44 is then pressed into the tubular housing 16 until the plate 44 engages both the upper insert 40 and the shoulder 22 formed in the tubular housing 16. After this has been completed, the frusto-spherical member 48 is slipped over the spindle 34 and the thrust washer is placed thereon, followed by the spring 62, the member 14, and the nut 66, in order.

Presently, most automobiles are provided with ball and socket joint suspension on the front steering linkage. The ball and socket joint 10 of this invention is especially well suited to such use. As constructed, the ball and socket joint 10 is adapted to accommodate relative oscillations between the member 14 and the member 12 or relative rotational movement between the members 12 and 14 about the axis of the spindle 34. In either relative oscillating or rotational movement, the ball portion 32 of the ball member 30 will move relative to the upper and lower inserts 40 and 24, respectively, which provide excellent lubricated bearing surfaces, especially in the preferred construction of molecularly dissimilar synthetic resins. If the movement is in oscillation between the members 12 and 14, the frusto-spherical member 48 will slide over the lower exterior surface 46 of the housing 16 and at all times maintain the aperture 20, which extends through the housing 16, closed in any operating position to prevent the entrance of dirt or other foreign material into the ball joint 10. If the movement between the members 12 and 14 is rotational, i.e., about the longitudinal axis of the spindle 34, the thrust washer 52 will generally rotate with the spindle 34 due to the force exerted by the spring 62 thereon, but it will rotate relative to the frusto-spherical member 48. As previously described, the frusto-spherical member 48 and the thrust washer 52 are formed from dissimilar resinous materials so that an excellent bearing surface is provided therebetween to reduce the friction through rotation to the very minimum.

It can be appreciated from the foregoing description and from observation of the drawings that the ball and socket joint 10, constructed in accordance with the invention, may be easily fabricated. The upper and lower inserts 40 and 24, respectively, may be formed by molding or may be machined, as desired. Likewise, it can be appreciated that the overall cost of the joint, constructed in accordance with the invention, has been substantially reduced due to the simplicity of the various parts and the ease with which they may be assembled. The joint disclosed herein is structurally strong and will provide a long, trouble-free operation due to the inherent lubricating characteristics of the dissimilar high density synthetic resins utilized in the preferred form of the invention. It should also be pointed out that the arrangement of the exterior parts, i.e., the frusto-spherical member 48 and the thrust washer 52 serves to insure that no foregin particles will enter the ball joint 10 during the operation thereof.

It should also be realized that the embodiment described herein is by way of example only and that many changes may be made thereto without departing from the spirit of the invention or from the scope of the annexed claims.

What we claim is:

1. A ball and socket joint for interconnecting two relatively moving members comprising:
   a generally tubular socket member having an internal flange portion at one end and adapted for attachment to one of said two relatively moving members to be interconnected by said joint, said tubular socket member having a hollow interior wall of generally circular transverse cross-section which tapers from a relatively small diameter adjacent said internal flange portion to a relatively larger diameter at the opposite end of said tubular socket member from said internal flange portion;
   a first high density synthetic resin bearing insert member having an external surface formed on a frustum of a cone so that said first insert member tapers from a relatively large diameter to a relatively smaller diameter, said first insert member having a substantially hemispherical socket formed therein and located in said tubular socket member with the external surface of said first insert member bearing against the tapered internal surface of said generally tubular socket member;
   a second synthetic resin bearing insert member having a substantially frusto-spherical socket formed therein, defined by an aperture extending therethrough, said second insert member having an exterior surface bearing against the tapered internal wall of said tubular socket member, said second insert member being located in said tubular member adjacent said internal flange portion and cooperating with, and contacting, said first insert member to form a substantially spherical chamber within the two contacting insert members;
   a substantially spherical ball member having a ball portion positioned in said chamber and having a spindle portion projecting from said ball portion and through said aperture in said second insert member, said spindle portion being adapted for attachment to the other of said two relatively moving members;
   a high density synthetic resin sheath around the ball portion of said ball member and a part of the spindle portion of said ball member, said synthetic resin sheath extending through the aperture in said second insert member and being constructed of a synthetic resin differing from the synthetic resins from which said first and second insert members are constructed; and
   a closure plate socket member located within said tubular member and engaged with said first insert member to retain said first and second insert members and said ball member within said tubular socket member, said internal flange portion at one end of said socket terminating in an aperture the inner periphery of which is provided with a smooth rounded contour thus preventing sharp edged contact with the portion of the synthetic resin sheath extending therethrough.

2. A ball and socket joint as defined in claim 1 wherein the exterior of said tubular member adjacent said internal flange portion is of frusto-spherical configuration, and said ball and socket joint further comprises:
   a first frusto-spherical member having a surface thereof adjacent the exterior of said tubular member and encircling said spindle portion, said surface of said frusto-spherical member adjacent the exterior of said tubular member conforming in configuration to the frusto-spherical configuration of the exterior of said tubular member;
   a second frusto-spherical member having a surface thereof conforming to the exterior of said first frusto-spherical member; and
   resilient means located between the member connected with said spindle portion and said second frusto-spherical member biasing said first and second frusto-spherical members into contact, and biasing said first frusto-spherical member against the exterior of said tubular member.

3. A ball and socket joint as defined in claim 1 wherein said plate member extends transversely across said tubular member and engages the internal wall thereof, said plate member further having a depression formed in the center thereof; and
   wherein said first high density synthetic resin insert member has a protuberant portion extending into, and complementary in configuration to, said recess in said plate member whereby retention of said first high density synthetic resin insert member in the proper position in said tubular member in relation to said ball member is in part facilitated by the engagement of said first insert member with said plate member.

References Cited

UNITED STATES PATENTS

| | | | |
|---|---|---|---|
| 2,880,025 | 3/1959 | Herbenar et al. | 287—85 |
| 2,912,267 | 11/1959 | Latzen | 287—90 |
| 3,063,744 | 11/1962 | Flumerfelt | 287—87 |
| 3,079,184 | 2/1963 | Melton et al. | 287—90 |
| 3,154,333 | 10/1964 | Townsend | 287—87 |
| 3,197,245 | 7/1965 | Beer | 287—87 |
| 3,240,518 | 3/1966 | Herbenar et al. | 287—87 |

FOREIGN PATENTS

| | | |
|---|---|---|
| 852,139 | 10/1960 | Great Britain. |
| 856,451 | 12/1960 | Great Britain. |

OTHER REFERENCES

Ulderup: German application 1,010,392, printed June 13, 1957 (Kl. 63 C 47), 1 sht. dwg., 2 pp. spec.

CARL W. TOMLIN, *Primary Examiner.*

A. V. KUNDRAT, *Assistant Examiner.*